L. NORZAGARAY.
APPARATUS FOR TREATING LATEX AND SHEETING THE COAGULATED PRODUCT.
APPLICATION FILED DEC. 17, 1913.

1,164,850.

Patented Dec. 21, 1915.
2 SHEETS—SHEET 1.

Witnesses:—
Eugene Wening

Leonidas Norzagaray
by Frank T. Wentworth
his Attorney.

L. NORZAGARAY.
APPARATUS FOR TREATING LATEX AND SHEETING THE COAGULATED PRODUCT.
APPLICATION FILED DEC. 17, 1913.

1,164,850.

Patented Dec. 21, 1915.
2 SHEETS—SHEET 2.

UNITED STATES PATENT OFFICE.

LEONIDAS NORZAGARAY, OF LONDON, ENGLAND.

APPARATUS FOR TREATING LATEX AND SHEETING THE COAGULATED PRODUCT.

1,164,850. Specification of Letters Patent. Patented Dec. 21, 1915.

Application filed December 17, 1913. Serial No. 807,213.

*To all whom it may concern:*

Be it known that I, LEONIDAS NORZAGARAY, a subject of the King of Great Britain and Ireland, residing at 19 Richmond street, Old Street, London, England, have invented an Apparatus for Treating Latex and Sheeting the Coagulated Product, of which the following is a specification.

This invention relates to an apparatus by means of which rubber milk or latex may be subjected to the coagulating action of suitable smoke from a firepot, and in which the period of such treatment may be lengthened or shortened according to the varying qualities of the material to be treated.

The object of this invention is to provide as apparatus which will rapidly and completely coagulate all kinds of rubber milk or latex and turn same out in sheet form, in one operation.

Figure 1:
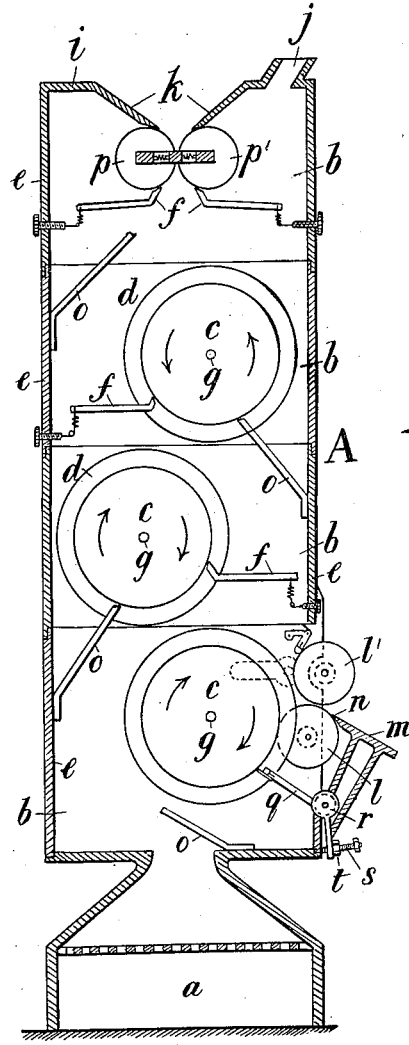
Figure 2:
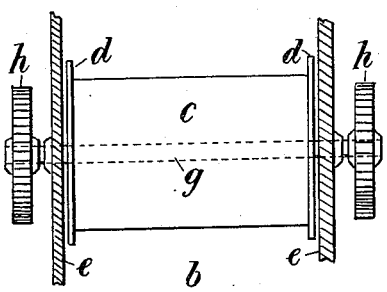
Figure 3:
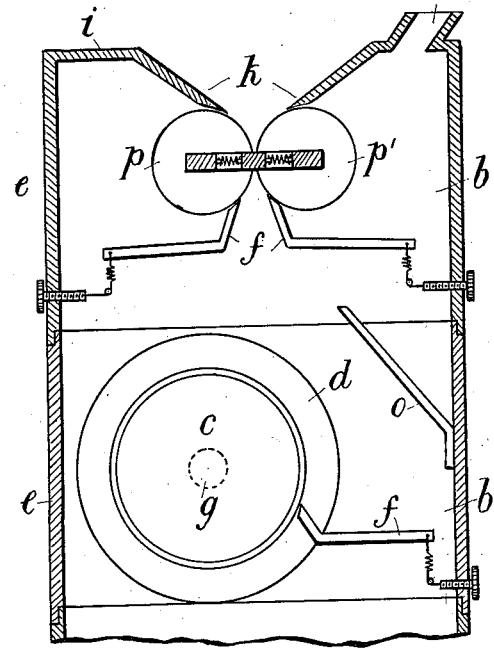
Figure 4:
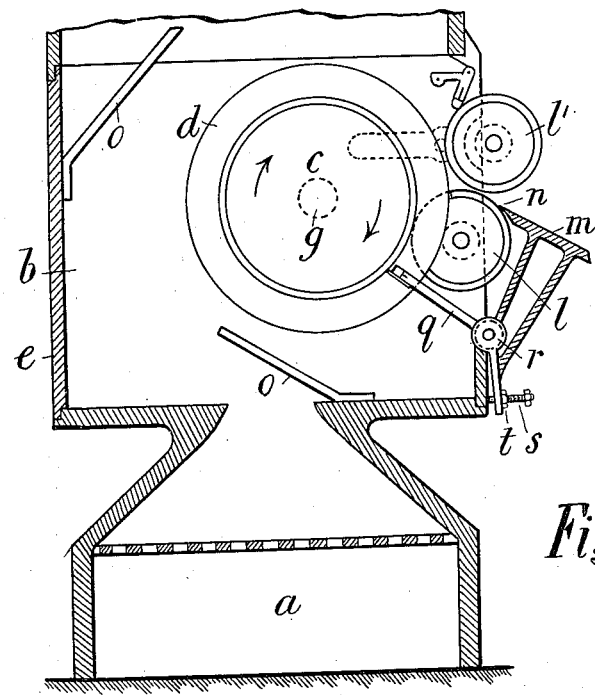

Referring to the accompanying drawings:—Figure 1 is a vertical section of the apparatus, showing the various parts assembled. Fig. 2 is a detail sectional view of part of one of the sections, showing a drum revolubly mounted in the walls thereof; Fig. 3, is an enlarged vertical section of one form of top section, with another section below, and Fig. 4 a similar view of the bottom section and firepot.

The apparatus consists of a suitable firepot $a$ for providing the necessary smoke, and a chimney A consisting of one, two, or any desired number of hollow metal sections $b$— of rectangular or other suitable shape— each section fitting over the one beneath, and being removable. The bottom section has a flange at its lower end and is fixed to the top of the firepot $a$ by means of bolts passing through holes in said flange. Any other suitable fixing means may be employed. A revoluble metal drum $c$ with flanged ends $d$, is mounted in the frame $e$ of each section except the top one and each of these drums in the sections intermediate of the top and bottom sections has an adjustable scraper $f$ arranged at any desired point around the lower part of its periphery. These drums may be mounted centrally, so that the drum of one section is immediately above that in the section below, or they may be mounted toward the left hand side of one section, and toward the right hand side of the section below, and so on alternately. The axles $g$ of the drums project through the frames and are rotated by chain driven cog wheels, such as $h$, fixed thereto, or by pulley wheels, operated by ropes or bands, or by other suitable means. Said rotating means may be actuated by hand, or by mechanical power, and may be so arranged as to drive the successive drums of the sections arranged between the top and bottom sections, in opposite directions, as shown by the arrows. Alternatively the drums may all be driven in the same direction, or two drums may be driven in the same direction. The top section of the chimney is provided with a cap or cover, $i$, fitted with an outlet $j$ for the smoke, a portion of the said cap or cover forming a feeding hopper $k$, for the latex. If desired, the smoke outlet may communicate with suitable apparatus for recovering the valuable by-products of the smoke. The bottom section of the chimney has a combined scraper and chute attached to one side thereof (not shown in the drawings) for scraping the rubber off the drum and conveying it away to a suitable receptacle, or to another machine, for further treatment. Alternatively, the bottom section has adjustable pressing rollers $l^1$, $l^1$, preferably corrugated, mounted in the sides thereof. A scraper (not shown in the drawings) is provided for scraping the rubber off the drum and causing it to pass between the pressing rollers, or, if desired, the roller $l$ may be brought into contact with said drum and thus serve as a scraper. The rollers $l$, $l^1$ press the rubber into sheet form and the sheet is led out at the side of the section by means of a suitable guide or chute $m$. This guide or chute is adjustably mounted on the frame of the section by means of the hinge $r$ and set screw $s$ with lock-nut $t$, so as to take up the wear on its point $n$ which is in contact with the roller $l$.

Baffle plates, such as $o$ are provided in each section, except the top one, for guiding the main portion of the smoke around that portion of the drum in the section above on which the latex or rubber is descending.

It is to be understood that all the sections between the top and bottom one are identical in construction and are interchangeable. Further, that the number of these sections employed will vary according to the time required to transform different qualities of latex into solid rubber.

In an alternative form of construction the intermediate and bottom sections may be dispensed with, and the main frame of the chimney made in one piece to contain any desired number of drums, scrapers, and baffle plates, provided at suitable intervals.

In an alternative construction the upper part of the chimney, will have a pair of laterally adjustable pressing rollers $p$, $p^1$, and scrapers $f$ mounted therein, immediately beneath the feeding hopper $k$.

The mother liquor given off during the treatment of the latex or rubber is prevented from falling into the fire and is conveyed out of the apparatus by means of a trap $q$ arranged at the side of the lowest drum, one end of said trap being in frictional engagement with the surface of said drum across the full width thereof.

The working of the apparatus is as follows: The firepot $a$ is charged with suitable fuel, which is ignited. As soon as the smoke in the chimney A becomes sufficiently dense, the drums $c$ are rotated, and latex alone—or latex and any suitable liquid for assisting coagulation—is poured into the feeding hopper $k$, which conveys it on to the first drum or—alternatively—the rollers $p$, $p^1$, around which it passes until it comes in contact with the scraper or scrapers $f$ by which it is removed and caused to fall upon the second drum. This action is repeated until the rubber reaches the bottom drum, from which it is removed by the side scraper (not shown) and conveyed down the chute, or—in the alternative construction—removed by the roller $l$ and carried between same and the other roller $l^1$, the resulting sheet being led out of the machine by the guide or chute $m$.

Claims:—

1. An apparatus for treating latex and sheeting the coagulated product embodying therein a chimney, means for developing smoke and passing it through said chimney, a plurality of drums arranged upon different vertical planes, means delivering latex to the uppermost of said drums, means removing latex from each of said drums and delivering it to the drum immediately therebelow and means removing the coagulated latex from the lowermost of said drums and delivering it in sheet form from the apparatus.

2. An apparatus for treating latex and sheeting the coagulated product embodying therein a chimney composed of a plurality of independent sections, arranged one above the other, each having therein a drum, means for developing smoke and passing it through said chimney, means carried by the uppermost section of said chimney whereby the latex is delivered to the uppermost of said drums, means removing latex from each of said drums and delivering it to the drum immediately therebelow, and means removing the coagulated latex from the lowermost of said drum and delivering it in sheet form from the apparatus.

3. An apparatus for treating latex and sheeting the coagulated product embodying therein a chimney, means for developing smoke and passing it from said chimney, a plurality of drums arranged upon different vertical planes, a hopper at the top of said chimney having an outlet through which latex may be delivered to the uppermost drum, means removing latex from each of said drums and delivering it to the drum immediately therebelow and means removing the coagulated latex from the lowermost of said drums and delivering it in sheet form from the apparatus.

4. An apparatus for treating latex and sheeting the coagulated product embodying therein a chimney, means for developing smoke and passing it from said chimney, a plurality of drums arranged upon different vertical planes, a hopper carried by said chimney having an outlet through which latex is delivered within the apparatus, a plurality of oppositely disposed rollers adapted to receive the latex passing through said opening, means removing said latex from said roller and delivering it to the uppermost drum, means for removing latex from each of said drums and delivering it to the drum immediately therebelow and means removing the coagulated latex from the lowermost of said drums and delivering it in sheet form from the apparatus.

5. An apparatus for treating latex and sheeting the coagulated product embodying therein a chimney, means for developing smoke and passing it through said chimney, a plurality of drums arranged upon different vertical planes, means delivering latex to the uppermost of said drums, a scraper operative upon each of said drums whereby the latex is removed therefrom and is delivered to the drum immediately below, and means removing the coagulated latex from the lowermost of said drums and delivering it in sheet form from the apparatus.

6. An apparatus for treating latex and sheeting the coagulated product embodying therein a chimney, means for developing smoke and passing it through said chimney, a plurality of drums arranged upon different vertical planes, each of said drums having side flanges thereon, means delivering latex to the uppermost of said drums, a scraper operative upon each of said drums whereby the latex is removed therefrom and is delivered to the drum immediately below, and means removing the coagulated latex from the lowermost of said drums and delivering it in sheet form from the apparatus.

7. An apparatus for treating latex and sheeting the coagulated product embodying therein a chimney, means for developing smoke and passing it through said chimney, a plurality of drums arranged upon different vertical planes, baffled plates upon the walls of said chimney adapted to direct the smoke against said drums, means delivering latex to the uppermost of said drums, means removing latex from each of said drums and delivering it to the drum immediately therebelow and means removing the coagulated latex from the lowermost of said drums and delivering it in sheet form from the apparatus.

8. An apparatus for treating latex and sheeting the coagulated product embodying therein a chimney, means for developing smoke and passing it through said chimney, a plurality of drums arranged upon different vertical planes, means delivering latex to the uppermost of said drums, means removing latex from each of said drums and delivering it to the drum immediately therebelow, a plurality of rollers adjacent the lowermost of said drums, one of said rollers operatively engaging said drum, a chute adapted to receive the latex from said last named rollers, and means for collecting and removing the fluids separated from the latex while within the apparatus.

In testimony whereof I affix my signature in presence of two witnesses.

LEONIDAS NORZAGARAY.

Witnesses:
  O. J. WORTH,
  HERBERT D. JAMESON.